(12) United States Patent
Park et al.

(10) Patent No.: US 10,044,294 B2
(45) Date of Patent: Aug. 7, 2018

(54) APPARATUS AND METHOD FOR CONTROLLING ASYMMETRIC MODULAR MULTILEVEL CONVERTER

(71) Applicants: Industry-Academic Cooperation Foundation, Yonsei University, Seoul (KR); Korea Electrotechnology Research Institute, Changwon-si, Gyeongsangnam-do (KR)

(72) Inventors: Jungwook Park, Seoul (KR); Soohyoung Lee, Gunpo-si (KR)

(73) Assignees: Industry-Academic Cooperation Foundation, Yonsei University, Seoul (KR); Korea Electrotechnology Research Institute, Changwon-si, Gyeongsangnam-do (KR)

( * ) Notice: Subject to any disclaimer, the term of this patent is extended or adjusted under 35 U.S.C. 154(b) by 0 days.

(21) Appl. No.: 15/367,700

(22) Filed: Dec. 2, 2016

(65) Prior Publication Data

US 2017/0163171 A1 Jun. 8, 2017

(30) Foreign Application Priority Data

Dec. 3, 2015 (KR) ........................ 10-2015-0171517

(51) Int. Cl.
 *H02M 7/5387* (2007.01)
 *H02M 7/537* (2006.01)
(52) U.S. Cl.
 CPC .................................. *H02M 7/537* (2013.01)
(58) Field of Classification Search
 CPC ........ H02M 1/14; H02M 1/32; H02M 7/5387;
 H02M 7/53871; H02M 3/1584; H02M
 3/285; H02M 7/49; H02M 7/48; H02M
 7/521; H02M 7/537; H02M 3/33507;
 H02M 3/33523; H02M 3/3155; H02M
 3/325; H02M 3/335
 USPC ... 363/40, 56.01, 56.02, 65, 71, 95, 98, 131,
 363/132
 See application file for complete search history.

(56) References Cited

U.S. PATENT DOCUMENTS

| | | | | |
|---|---|---|---|---|
| 7,548,443 | B2 * | 6/2009 | Arisawa ............ | H02M 7/53875 363/132 |
| 7,606,052 | B2 * | 10/2009 | Akagi .................... | H02M 1/12 363/40 |
| 7,990,097 | B2 * | 8/2011 | Cheng ................ | H02M 5/4585 318/800 |

(Continued)

FOREIGN PATENT DOCUMENTS

| KR | 10-2014-0051810 A | 5/2014 |
|---|---|---|
| KR | 10-2015-0028282 A | 3/2015 |

*Primary Examiner* — Adolf Berhane
(74) *Attorney, Agent, or Firm* — Rabin & Berdo, P.C.

(57) ABSTRACT

Disclosed is an apparatus and method for controlling an asymmetric modular multilevel converter which allow numerous levels to be expressed according to a combination of modules each using a different voltage, comprising: an asymmetric arm configured with a full bridge and a half bridge; and a control method of controlling each capacitor level of the full bridges and capacitor level of the remaining half bridges to be different from one another by a full bridge structure, wherein each module configuring the asymmetric arm uses a different voltage and an output voltage is expressed by a combination thereof.

15 Claims, 12 Drawing Sheets

(56) References Cited

U.S. PATENT DOCUMENTS

| | | | | |
|---|---|---|---|---|
| 8,345,452 B2* | 1/2013 | Alexander | H02M 3/1582 |
| | | | 363/124 |
| 8,514,601 B2* | 8/2013 | Alexander | H02M 5/225 |
| | | | 363/132 |
| 9,077,274 B2* | 7/2015 | Shinomoto | F25B 49/025 |
| 9,628,003 B2* | 4/2017 | Shinomoto | H02P 6/12 |
| 9,716,425 B2* | 7/2017 | Nami | H02M 1/32 |
| 9,780,717 B2* | 10/2017 | Uemura | H02P 27/08 |
| 9,806,599 B2* | 10/2017 | Geske | H01T 2/02 |
| 9,819,188 B1* | 11/2017 | Pan | H02J 3/36 |
| 2005/0281067 A1* | 12/2005 | Deng | H02M 7/53875 |
| | | | 363/131 |
| 2007/0189044 A1* | 8/2007 | Liu | H02M 5/4585 |
| | | | 363/34 |
| 2010/0142234 A1* | 6/2010 | Abolhassani | H02M 5/4585 |
| | | | 363/41 |
| 2011/0292697 A1* | 12/2011 | Alexander | H02M 5/275 |
| | | | 363/37 |
| 2011/0310585 A1* | 12/2011 | Suwa | H05K 7/1432 |
| | | | 361/820 |
| 2012/0081061 A1* | 4/2012 | Zargari | H02J 3/01 |
| | | | 318/503 |
| 2015/0357905 A1* | 12/2015 | Nami | H02M 1/32 |
| | | | 363/53 |
| 2016/0233762 A1* | 8/2016 | Mathew | H02M 7/483 |
| 2016/0248321 A1* | 8/2016 | Srivastava | H02M 3/22 |
| 2017/0016655 A1* | 1/2017 | Shinomoto | H02M 1/12 |
| 2017/0272006 A1* | 9/2017 | Uemura | H02M 7/53871 |

* cited by examiner

APPARATUS AND METHOD FOR CONTROLLING ASYMMETRIC MODULAR MULTILEVEL CONVERTER

CROSS-REFERENCE TO RELATED APPLICATION

This application claims priority to and the benefit of Korean Patent Application No. 2015-0171517, filed on Dec. 3, 2015, the disclosure of which is incorporated herein by reference in its entirety.

BACKGROUND

1. Field of the Invention

The present invention relates to an asymmetric modular multilevel converter, and more particularly, to an apparatus and method for controlling an asymmetric modular multilevel converter, which allow numerous levels to be expressed according to a combination of modules each using a different voltage.

2. Discussion of Related Art

Generally, a modular multilevel converter (MMC) includes a plurality of sub-modules in which a power semiconductor circuit forms two output terminals, and the plurality of sub-modules are connected in series.

Each sub-module includes, for example, an energy storage unit and a power semiconductor.

The power semiconductor may be configured with a power semiconductor switch and a free-wheeling diode and may be implemented with an insulated gate bipolar transistor (IGBT), for example. Such a sub-module is configured with a so-called half bridge circuit, a full bridge circuit or the like for which a plurality of power semiconductors are connected to each other.

In addition, one of a voltage of the energy storage unit, a zero voltage, and an inverted voltage of the energy storage unit is shown between the two output terminals of the sub-module of the MMC.

In such a conventional technology, a problem that an enormously high circulating current is generated when voltages of modules are controlled to be different using a half bridge structure arises, and this can be completely resolved by control using a full bridge structure.

Therefore, technology development for new multilevel converter control is required.

RELATED ART DOCUMENT

Patent Document (Patent Document 1) Korean Patent Laid-Open Publication No. 10-2015-0028282
(Patent Document 2) Korean Patent Laid-Open Publication No. 10-2014-0051810

SUMMARY OF THE INVENTION

The present invention is directed to providing an apparatus and method for controlling an asymmetric modular multilevel converter capable of expressing numerous levels according to a combination of modules each using a different voltage.

The present invention is also directed to providing an apparatus and method for controlling an asymmetric modular multilevel converter, in which the converter is configured as an asymmetric arm configured with full bridges and half bridges and is capable of accurately controlling capacitor levels of each full bridge and capacitor levels of the remaining half bridges to be different from one another by a full bridge structure.

The present invention is also directed to providing an apparatus and method for controlling an asymmetric modular multilevel converter, in which the converter uses a different capacity voltage for each level to implement an exponentially increased number of output voltage levels compared to a number of modules and is capable of eliminating a circulating current and constantly controlling capacitor voltages by precise control of a full bridge.

The present invention is also directed to providing an apparatus and method for controlling an asymmetric modular multilevel converter, which allow a full bridge structure to serve the role of blocking a fault current introduced from an alternating current (AC) circuit when a problem occurs at a direct current (DC) circuit.

The technical objectives of the present invention are not limited to the above objects, and other objectives not described herein may become apparent to those of ordinary skill in the art on the basis of the following description.

According to an aspect of the present invention, there is provided an apparatus for controlling an asymmetric modular multilevel converter, including an asymmetric arm configured with a full bridge and a half bridge; and a control method of controlling each capacitor level of the full bridge and capacitor level of the remaining half bridge to be different from one another by a full bridge structure, wherein each module configuring the asymmetric arm uses a different voltage and an output voltage is expressed by a combination thereof.

An upper asymmetric arm and a lower asymmetric arm may be connected in series between a $V_{DC}$ input terminal and a $V_{AC}$ output terminal to configure a single-phase asymmetric modular multilevel converter, and three single-phase asymmetric modular multilevel converters may be connected by sharing a direct current (DC) bus to configure a three-phase asymmetric modular multilevel converter.

The asymmetric arm may be configured with N Modules f configured with the full bridge and K Modules h configured with the half bridge between a $V_{DC}$ positive (+) input terminal and a $V_{DC}$ negative (−) input terminal, each Module h may be responsible for an equally divided voltage, and a sum of internal capacitor voltages of Modules h may always be a voltage which is equal to a DC bus voltage ($V_{DC}$) when the asymmetric modular multilevel converter (AMMC) is in a normal state.

An internal capacitor voltage of the Modules f configured with the full bridge may be configured to be different in sequence by control, and an internal capacitor voltage of a Module f 1 may be ½ of the DC bus voltage, an internal capacitor voltage of a Module f 2 may be ¼ of the DC bus voltage, and an internal capacitor voltage of a Module f N may be $2^{-N}$ of the DC bus voltage.

When the arm is configured with only one Module h, two levels of +½ and −½ may be implemented, and when the arm is configured with K Modules h, "K+1" levels in total may be implemented from −½ to +½ by the Modules h, and a capacitor voltage reference value ($V_{DC}$) of the Module f may be 1/K.

N Modules f and K Modules h may implement a total of "$2^N$−K+1" levels.

The Modules f remaining after excluding the Module h responsible for the maximum voltage may have the full bridges, and when there is one Module h, a sum of the capacitor voltages of N connected Modules f may be $V_{DC}$ ($1-2^{-N}$), and a fault current may be blocked by a capacitor voltage of $1/(1-2^{-N})$ times the capacitor voltage in a normal state when a problem occurs at a DC circuit.

To apply the apparatus for controlling an asymmetric modular multilevel converter to an asymmetric cascaded H-bridge converter, H-bridge converters may be connected in series to configure the asymmetric cascaded H-bridge converter, and the asymmetric cascaded H-bridge converter may subdivide an output of a voltage source converter (Converter AC Out) of a single-level, a multi-level, and a multilevel converter (MMC) to output a new output (Modified AC Out) having over ten output voltage levels.

When a level of the Converter AC Out is assumed to be a J level, a level of the Modified AC Out of the asymmetric cascaded H-bridge converter configured with N H-bridge may be "$(J-1) \cdot 2^N + 1$".

According to another aspect of the present invention, there is provided a method of controlling an asymmetric modular multilevel converter, comprising: in control of an asymmetric arm configured with N Modules f configured with a full bridge and K Modules h configured with a half bridge between a $V_{DC}$ positive input terminal (+) and a $V_{DC}$ negative input terminal (−), each Module h is responsible for an equally divided voltage, a sum of internal capacitor voltages of Modules h is always a voltage which is equal to a DC bus voltage ($V_{DC}$) when the AMMC is in a normal state, and internal capacitor voltages of the Modules f configured with the full bridge are configured to be different in sequence by control.

When a current (i) flowing into an arm which configures a converter from a positive voltage portion of a converter DC voltage ($V_{DC}$) is considered, a correlation with a voltage $V_C$ applied to a capacitor of module n may be controlled on the basis of Expression 1 which is $(V_{DC}/2^n - V_{Cn})*i>0$.

When $(V_{DC}/2^n - V_{Cn})>0$, a capacitor voltage of the module may be equal to or lower than an optimal level and require charging, and when i>0, it may be judged that a current flows through the arm in a direction from a high voltage to a low voltage of the DC bus and the module may be controlled by a negative state (−) to charge the capacitor.

When $(V_{DC}/2 - V_{Cc}n)<0$, a capacitor voltage of a module may be equal to or higher than an optimal level and require discharging, and when i<0, it may be judged that a current flows through the arm in a direction from a negative voltage to a positive voltage of the DC bus and the module may be controlled by a negative state (−) to discharge the capacitor.

Among states not satisfying Expression 1, when values at the right and left sides of the expression are the same, the capacitor voltage may be judged to be in an ideal state and the module may be controlled by a zero state(0) to maintain the capacitor voltage without change or is controlled to repeat a positive state (+) or a negative state (−), and among the states not satisfying Expression 1, when the left side value of the expression is less than zero including two cases of $(V_{DC}/2^n - V_{Cn})<0$ while i>0 and $(V_{DC}/2^n - V_{Cn})>0$ while i<0, the module may be controlled by a positive state (+) to discharge or charge the capacitor.

An alternating current (AC) output voltage of the highest Module h which is responsible for the highest voltage may be within a range of the $V_{DC}$ which is the DC bus voltage and the capacitor voltage of the Module h may be maintained at a level of $1/KV_{DC}$.

An upper asymmetric arm and a lower asymmetric arm may be connected in series between a $V_{DC}$ input terminal and a $V_{AC}$ output terminal to configure the asymmetric modular multilevel converter, modules of each arm may be controlled so that a sum of the Module h voltages applied to each of the upper arm and the lower arm is $V_{DC}$, and half of a total amount of the Modules h of the upper arm and the lower arm may always be turned on or off.

Voltage control between Modules h may be performed while comparing a voltage between modules so that a module having the lowest voltage is first charged and a module having the highest voltage is first discharged according to a flow of a current.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, an apparatus and method for controlling an asymmetric modular multilevel converter according to embodiments of the present invention will be described in detail below.

Features and advantages of the apparatus and method for controlling an asymmetric modular multilevel converter according to the embodiments of the present invention will be made apparent with reference to detailed description of each embodiment to be described below.

Figure 5:
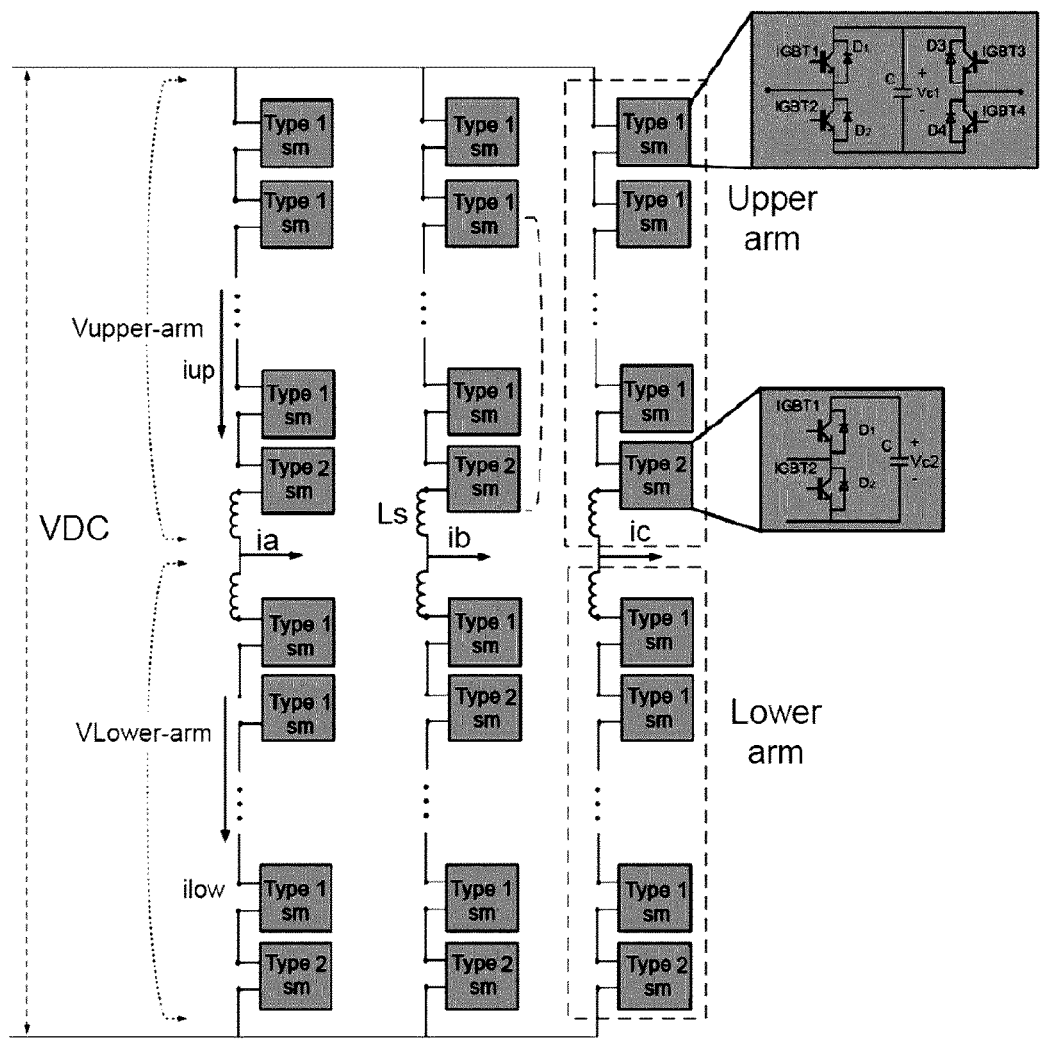
FIG. 5 is a configuration view of an asymmetric modular multilevel converter apparatus according to an embodiment of the present invention.

FIG. 5 is a configuration view of an asymmetric modular multilevel converter apparatus according an embodiment of the present invention.

The present invention allows a converter to express numerous levels according to a combination of modules each using a different voltage, and the converter is configured as an asymmetric arm configured with full bridges and half bridges to accurately control capacitor levels of each full bridge and capacitor levels of the remaining half bridges to be different from one another by a full bridge structure.

The present invention allows a converter to implement an exponentially increased number of output voltage levels compared to a number of modules using a different capacity voltage for each level, allows the converter to eliminate a circulating current and constantly control the capacitor voltage by precise control of a full bridge, and allows a full bridge structure to serve the role of blocking a fault current flowing in from an alternating current (AC) circuit when a problem occurs at a direct current (DC) circuit.

An asymmetric modular multilevel converter according to the embodiment of the present invention to attain this end includes an asymmetric arm configured with full bridges and half bridges, and a control method of accurately controlling capacitor levels of each full bridge and capacitor levels of the remaining half bridges to be different from one another by a full bridge structure.

Figure 1:
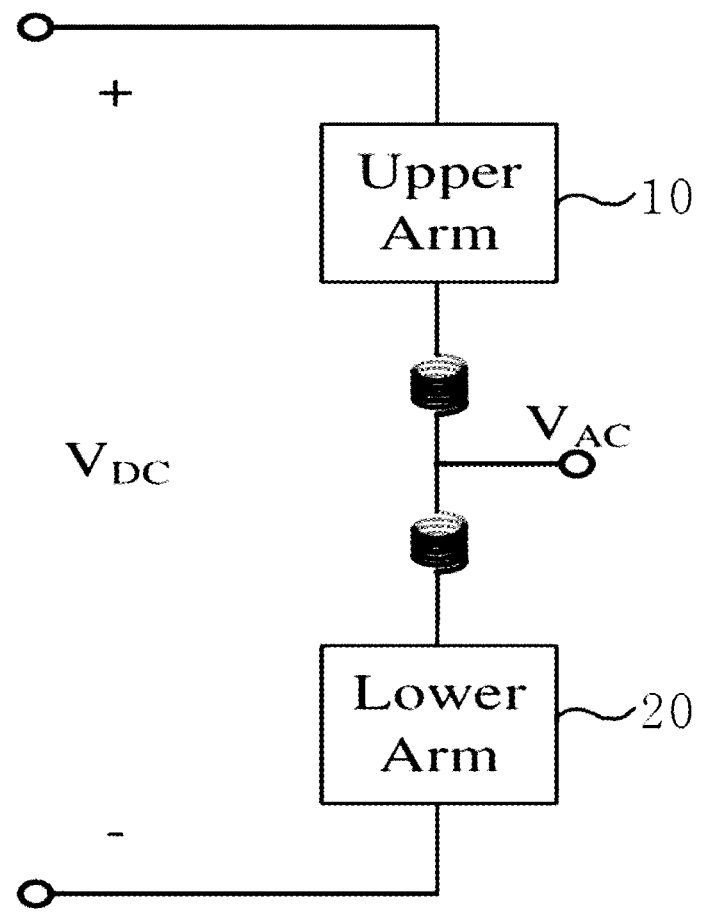
FIG. 1 is a configuration view of a single-phase asymmetric modular multilevel converter.

FIG. 1 is a configuration view of a single-phase asymmetric modular multilevel converter.

Figure 2:
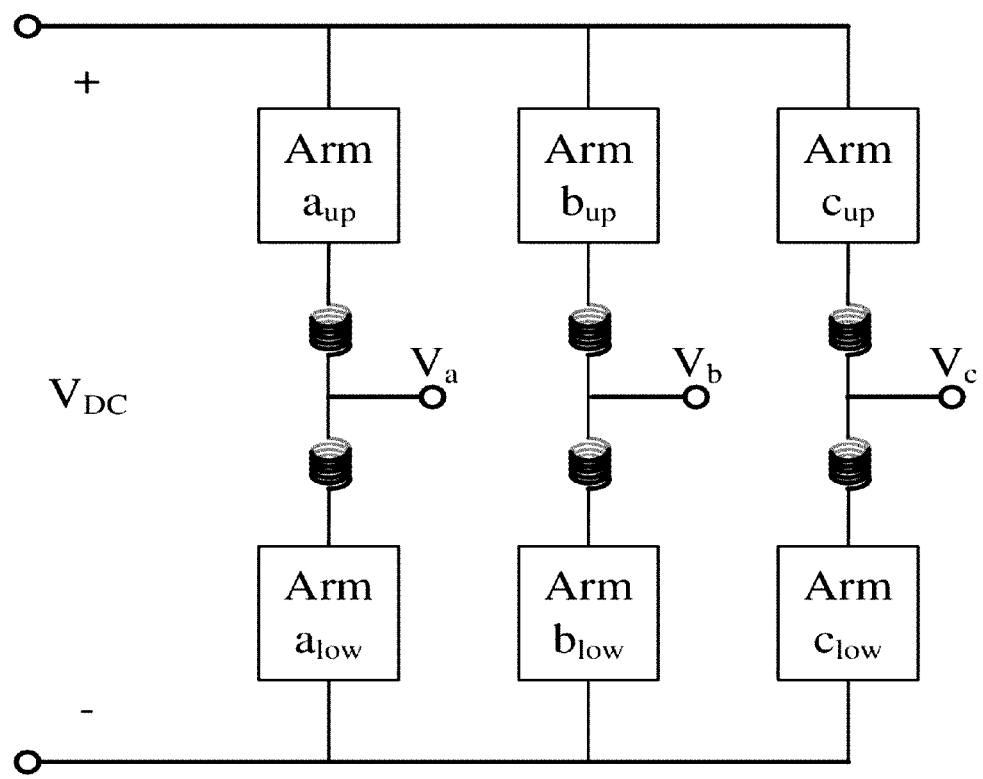
FIG. 2 is a configuration view of a three-phase asymmetric modular multilevel converter.
Figure 3:
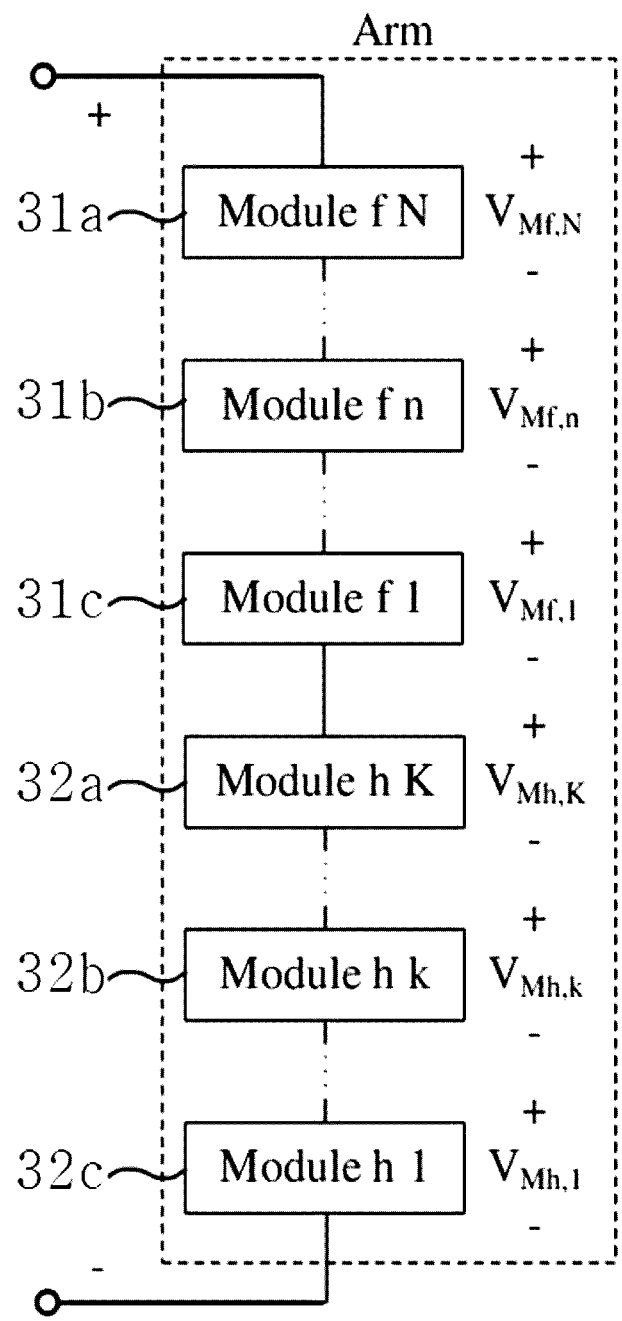
FIG. 3 is a configuration view of a converter arm.

In addition, FIG. 2 is a configuration view of a three-phase asymmetric modular multilevel converter, and FIG. 3 is a configuration view of a converter arm.

The single-phase asymmetric modular multilevel converter according to an embodiment of the present invention includes an upper arm 10 and a lower arm 20 connected in series between input terminals $V_{DC}$ and an output terminal $V_{AC}$ as illustrated in FIG. 1, which is the same as a conventional DC-to-AC converter in basic configuration and the conventional technology for power supply may be used without problems in any state of system interconnection or system separation.

In addition, the converter according to the embodiment of the present invention is easily converted into a three-phase converter when three of the structures are connected by sharing a DC bus as illustrated in FIG. 2.

Each arm of the asymmetric modular multilevel converter (AMMC) according to the embodiment of the present invention includes a plurality of modules.

However, instead of all modules using the same voltage, each module uses a different voltage as illustrated in FIG. 3 to allow numerous output voltage levels to be expressed according to a combination thereof.

In modules of FIG. 3, n represents a number from one to N, and N represents the total number of Modules f.

Figure 4A:
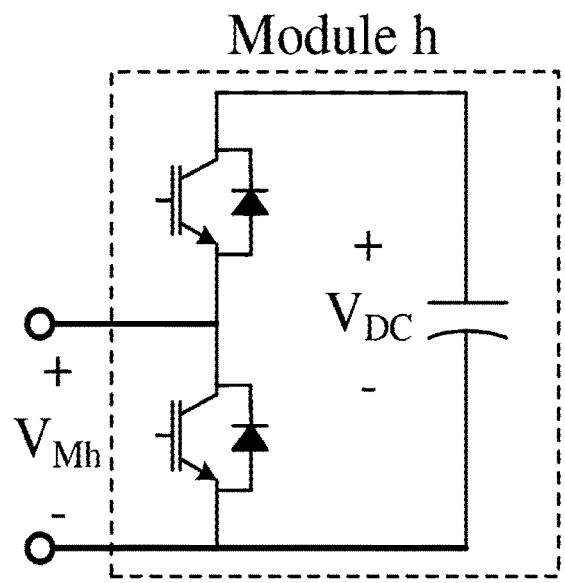
FIG. 4A is a configuration view of a half bridge module.
Figure 4B:
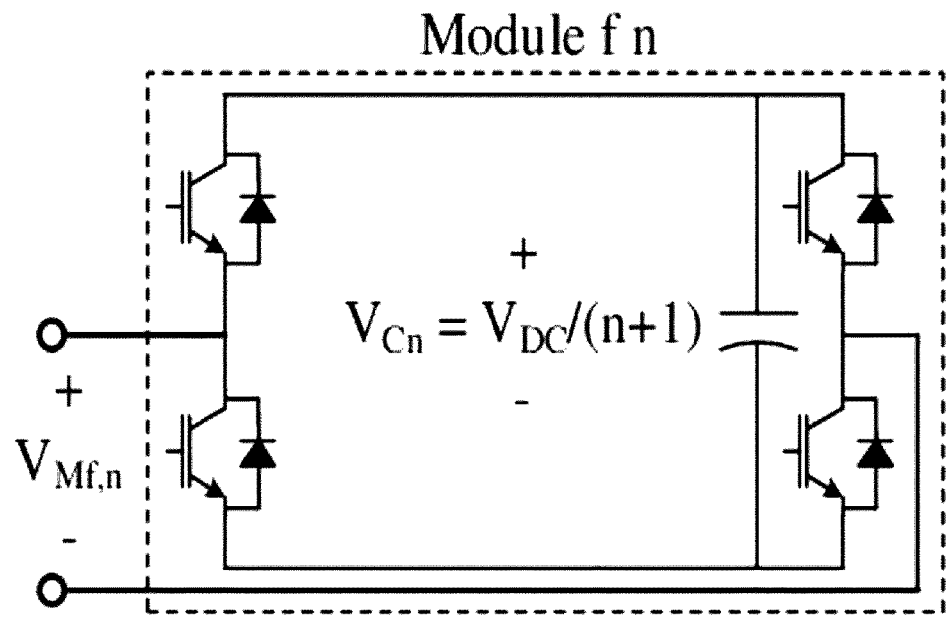
FIG. 4B is a configuration view of a full bridge module.

FIG. 4A is a configuration view of a half bridge module, and FIG. 4B is a configuration view of a full bridge module.

The Module h is configured with the half bridge as illustrated in FIG. 4A and the Module f is configured with the full bridge as illustrated in FIG. 4B.

$V_M$ represents a voltage applied to each module. An arm may be configured with K Modules h for being applied to a high voltage without using a transformer, and here, each Module h is responsible for equally divided voltage apiece.

An internal capacitor voltage of the Module h configured with the half bridge is always $V_{DC}$ which is equal to a DC bus voltage when the AMMC is in a normal state.

An internal capacitor voltage of the Modules f configured with the full bridge is differently configured in sequence by control. That is, an internal capacitor voltage of a Module f 1 is ½ of the DC bus voltage, an internal capacitor voltage of a Module f 2 is ¼ of the DC bus voltage, and an internal capacitor voltage of a Module f N is $2^{-N}$ of the DC bus voltage.

When an arm is configured with only one Module h, two levels of +½ and −½ are implemented, and when an arm is configured with K Modules h, "K+1" levels in total are implemented from −½ to +½.

Here, a capacitor voltage reference value ($V_{DC}$ of FIG. 4B) of the Module f becomes 1/K.

In addition, when one Module f is added to one Module h (a Module f 1), three levels of +½, 0 and −½ are implemented.

When one more Module f n is added (the Module f 1 and the Module f 2), five levels of +½, +¼, 0, −¼, and −½ are implemented, and levels implemented by three Modules f and one Module h (the Module f 1, the Module f 2, a Module f 3, and the Module h 1) are nine in total including +½, +⅜, +¼, +⅛, 0 −⅛, −¼, −⅜, and −½. That is, N Modules f and one Module h implement "$2^N+1$" levels in total.

Characteristics of the full bridge and half bridge combination will be described below in detail.

When a voltage of each module is controlled to be different using an asymmetric half bridge, a problem that an enormously high circulating current is generated arises, and the problem may be resolved by control of a symmetric half bridge or full bridge structure.

A half bridge has been the mainstream for a conventional MMC, and a circulating current can be decreased by control because capacitor voltages of all the modules are equal and symmetrical.

Loss of the half bridge structure is half of the loss in the full bridge structure because the number of switching devices through which a current passes is half that in the full bridge.

By configuring a module responsible for the highest voltage with the half bridge, the AMMC according to the embodiment of the present invention may maximize overall efficiency of the AMMC in spite of the fact that a majority of modules are configured with the full bridge.

This is possible because the module that configures the highest level does not need to apply a voltage in a reverse direction.

In addition, the Modules f that remaining after excluding the Module h responsible for the highest voltage have full bridges, a sum of the capacitor voltages of N connected Modules f is $V_{DC}(1-2^{-N})$ when there is one Module h, and a fault current may be blocked by a capacitor voltage of $1/(1-2^{-N})$ times the capacitor voltage in a normal state when a problem occurs at the DC circuit.

This is a characteristic that is impossible in the half bridge and is available only in the full bridge, and therefore the AMMC has the additional feature of blocking a DC fault current in addition to the original purpose of control.

In addition, control for capacitor balancing and multilevel output will be described below.

Figure 6:
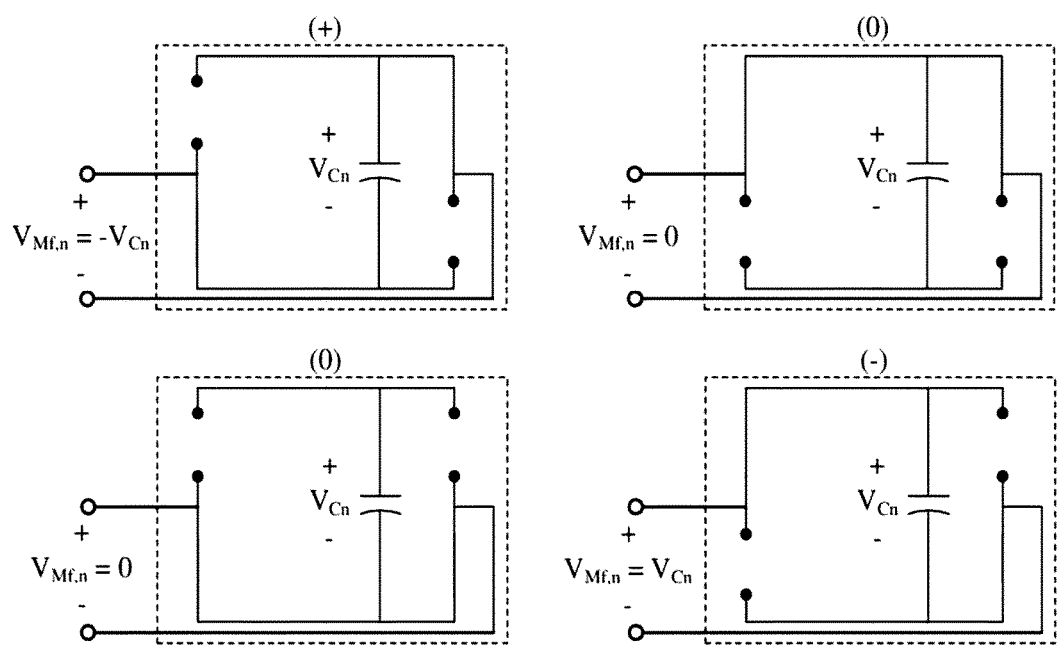
FIG. 6 is a configuration view illustrating control of charging and discharging a capacitor in a full bridge module.
Figure 7:
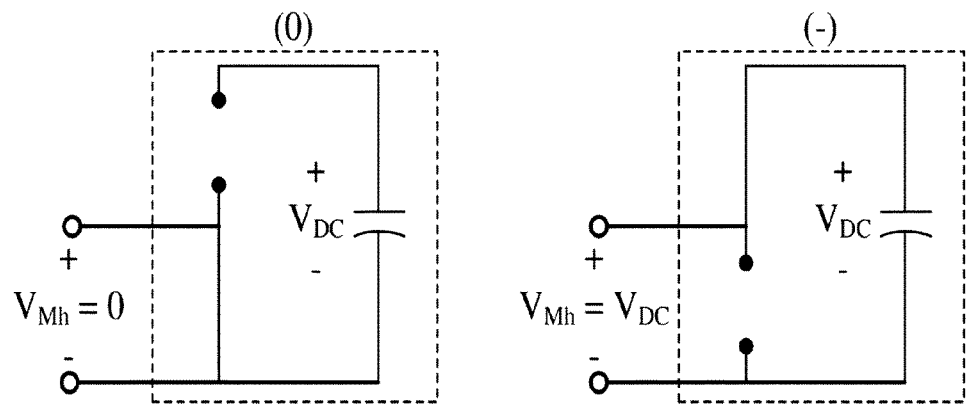
FIG. 7 is a configuration view illustrating control of charging and discharging a capacitor in a half bridge module.

FIG. 6 is a configuration view illustrating control of charging and discharging a capacitor in a full bridge module, and FIG. 7 is a configuration view illustrating control of charging and discharging a capacitor in a half bridge module.

Figure 8:
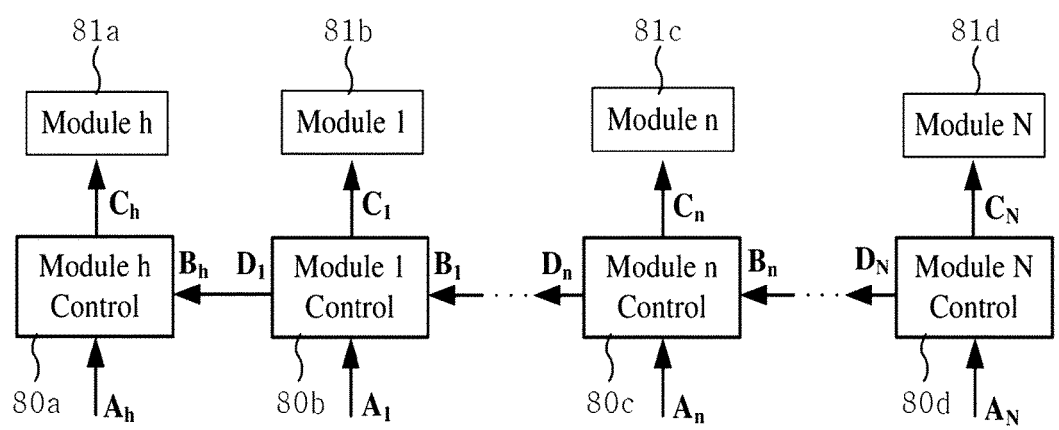
FIG. 8 is a block diagram of individual module control.

In addition, FIG. 8 is a block diagram of individual module control.

When a current (i) flowing into a converter arm from the positive voltage portion of the converter DC voltage $V_{DC}$ is considered, a correlation with a voltage $V_C$ applied to a capacitor of module n is compared as in Expression 1 below to be controlled.

$$(V_{DC}/2^n - V_{Cn})*i > 0 \qquad \text{[Expression 1]}$$

Here, n represents an order of individual full bridge modules responsible for a voltage, and $V_{Cn}$ represents a voltage applied to the capacitor of module n.

When $(V_{DC}/2^n - V_{Cn}) > 0$, a capacitor voltage of a module is equal to or lower than an optimal level and requires charging, and the case of "i>0" represents a state in which a current flows through the arm in a direction from a high voltage to a low voltage of the DC bus.

That is, in the state of Expression 1, the module is controlled by a negative state (−) of FIG. 6 to charge the capacitor.

Conversely, when $(V_{DC}/2^n - V_{Cn}) < 0$, a capacitor voltage is equal to or higher than an optimal level and requires discharging, and a current flows through the arm in a positive direction from a negative voltage of the DC bus because Expression 1 is satisfied in the case of "i<0".

That is, in this case, the capacitor may be discharged by the control of the negative state (−) of FIG. 6.

Among states not satisfying Expression 1, when values at the right and left sides of Expression 1 are the same, the capacitor voltage represents an ideal state and practically corresponds to a moment.

In the case above, depending on a state of the output voltage, the module is controlled by a zero state (0) of FIG. 6 to maintain the capacitor voltage without change or is controlled to repeat a positive state (+) or the negative state (−) of FIG. 6.

In addition, among states not satisfying Expression 1, states in which the left side value of Expression 1 is less than zero are two cases including "$(V_{DC}/2^n - V_n) < 0$" while i>0 and "$(V_{DC}/2^n - V_{Cn}) > 0$" while i<0, and the module may be controlled by the positive state (+) of FIG. 6 to appropriately charge and discharge the capacitor.

The zero state (0) of FIG. 6 is an operation in which the module does not have to apply a voltage at a particular output level, and in a state in which the module has to apply a voltage, the module operates by the positive state (+) or negative state (−).

Control of each module is configured as shown in Table 1, and an input signal is sent to a next higher level module according to the positive state (+), the zero state(0), or the negative state (−) of the current module to enable appropriate control of the higher module.

The input signal received from a next lower level module is added to a binary input signal which represents a level of the current module and thereby a final requirement level is determined.

The same principle as above is applied to all Modules f, and an input signal of the lowest Module f N is always zero because there is no next lower level module thereunder and is controlled as shown in Table 2.

TABLE 1

| | | Current module input level (A) | 1 | | | 0 | | |
|---|---|---|---|---|---|---|---|---|
| | | Receiving signal from next lower level (B) | 1 | 0 | −1 | 1 | 0 | −1 |
| | | Final requirement level (A + B) | 2 | 1 | 0 | 1 | 0 | −1 |
| $(V_{DC}/2^n - V_{Cn}) * i > 0$ | | Transferring signal to next higher level (D) | 1 | 0 | 0 | 0 | 0 | −1 |
| | | Current module control (C) | (0) | (+) | (0) | (+) | (0) | (+) |
| $(V_{DC}/2^n - V_{Cn}) * i < 0$ | | Transferring signal to next higher level (D) | 1 | 1 | 0 | 1 | 0 | 0 |
| | | Current module control (C) | (0) | (−) | (0) | (−) | (0) | (−) |

TABLE 2

| | Current module input level (A) | 1 | 0 |
|---|---|---|---|
| $(V_{DC}/2^n - V_{Cn}) * i > 0$ | Transferring signal to next higher level (D) | 0 | 0 |
| | Current module control (C) | (+) | (0) |
| $(V_{DC}/2^n - V_{Cn}) * i < 0$ | Transferring signal to next higher level (D) | 1 | 0 |
| | Current module control (C) | (−) | (0) |

Here, the highest module of Module h is the half bridge structure and the module level may not be a positive number. That is, an AC output voltage may not exceed $V_{DC}$ which is the DC bus voltage.

In addition, since the output of the converter is within a range of $V_{DC}$, the final requirement level of the output voltage implemented by the highest module is limited to 1 or 0. That is, signal B may not be 1 when signal A at the highest level is 0, and signal B may not be −1 when signal A is 0.

A capacitor voltage of the highest Module h is maintained at a level of $1/KV_{DC}$ and operates in a different manner than the lower Module f which maintains an accurate capacitor voltage according to an algorithm.

The operation principle is the same as the principle in which module voltages in a conventional MMC are naturally balanced by a correlation with the DC bus.

That is, modules of each arm are controlled so that a sum of the Module h voltages applied to each of the upper arm and the lower arm is a voltage of $V_{DC}$.

For the control, half of the total amount of the Modules h of the upper Arm and lower Arm is always turned on or off.

For example, when a voltage of $\frac{1}{4}V_{DC}$ is applied to the upper Arm, a voltage of $\frac{3}{4}V_{DC}$ is controlled to be applied to the lower arm.

Here, the output voltage becomes $\frac{1}{4}V_{DC}$ by $-\frac{1}{2}V_{DC}+\frac{3}{4}VDC$ (or $\frac{1}{2}V_{DC}-\frac{1}{4}V_{DC}$).

The voltage of the DC power supply and the voltage applied to the module in real time are maintained at an equal level, and consequently a current direction and a capacitor voltage level of the highest module need not be considered in the control of the capacitor voltage.

The highest module is controlled as shown in Table 3, and a state of the module according to a control signal is illustrated in FIG. 7.

TABLE 3

| Current module input level (A) | 1 | | 0 | |
|---|---|---|---|---|
| Receiving signal from next lower level (B) | 0 | −1 | 1 | 0 |
| Final requirement level (A + B) | 1 | 0 | 1 | 0 |
| Current module control (C) | (0) | (−) | (0) | (−) |

For example, when an arm configured with three Modules h configures a converter, when a case in which two Modules h are in a zero state (0) and one Module h is in a negative state (−) is assumed when signal C in FIG. 3 is in a zero state (0), one Module h becomes a zero state (0) and two Modules h become negative states (−) when signal C is a negative state (−). This is shown in Table 4.

TABLE 4

| | Sum of each Module h level (A) | | | | | | | | | |
|---|---|---|---|---|---|---|---|---|---|---|
| | 3 | | | 2 | | | 1 | | | 0 |
| Receiving signal from next lower level (B) | 0 | −1 | 1 | 0 | −1 | 1 | 0 | −1 | 1 | 0 |
| Number of (0) state module | 3 | 2 | 3 | 2 | 1 | 2 | 1 | 0 | 1 | 0 |
| Number of (−) state module | 0 | 1 | 2 | 1 | 2 | 1 | 2 | 3 | 2 | 3 |

Voltage control between Modules h is performed while comparing a voltage between modules so that a module having the lowest voltage is first charged and a module having the highest voltage is first discharged according to a flow of current in the same manner as in conventional control of MMC modules.

As described above, a current module control signal of a positive state (+), a zero state (0), or a negative state (−) that is finally determined is transferred to each module to determine a state of the module, which is the same as in FIG. 8.

FIG. 8 illustrates a control block for individual modules, and the control blocks includes a Module h control block 80a which controls a Module h 81a, a Module 1 control block 80b which controls a Module 1 81b, a Module n control block 80c which controls a Module n 81c, and a Module N control block 80d which controls a Module N 81d.

Input signal A of FIG. 8 is obtained as shown in Expression 2 below by binary conversion of an output voltage level.

$$\text{Output voltage level} = 2^N A_h + 2^{N-1} A_1 + \ldots + 2^{N-n} A_n + \ldots + A_N \quad \text{[Expression 2]}$$

Figure 9:
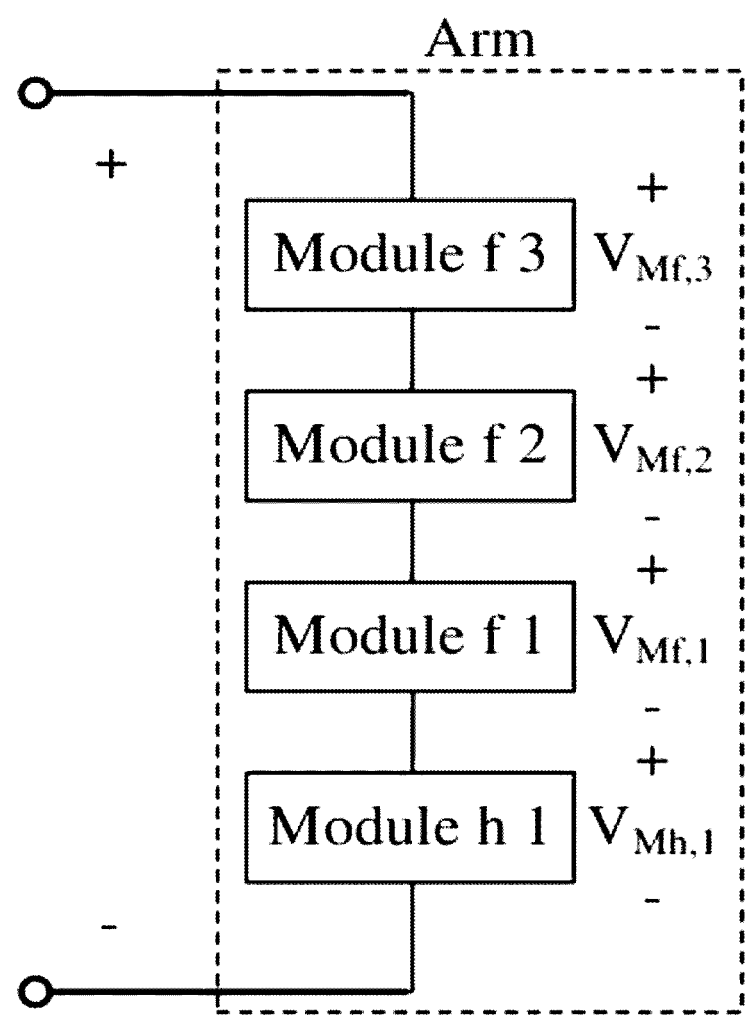
FIG. 9 is a configuration view illustrating an example of an arm configured with three full bridge modules and one half bridge module.

For example, when there are three full bridge modules (N=3) as illustrated in FIG. 9, output voltages are nine levels in total from zero to eight and may be stated as in Table 5.

FIG. 9 is a configuration view illustrating an example of an arm configured with three full bridge modules and one half bridge module.

TABLE 5

| Output voltage level | Binary number (4 digits) | $A_h$ | $A_1$ | $A_2$ | $A_3$ |
|---|---|---|---|---|---|
| 0 | 0000 | 0 | 0 | 0 | 0 |
| 1 | 0001 | 0 | 0 | 0 | 1 |
| 2 | 0010 | 0 | 0 | 1 | 0 |
| 3 | 0011 | 0 | 0 | 1 | 1 |
| 4 | 0100 | 0 | 1 | 0 | 0 |
| 5 | 0101 | 0 | 1 | 0 | 1 |
| 6 | 0110 | 0 | 1 | 1 | 0 |
| 7 | 0111 | 0 | 1 | 1 | 1 |
| 8 | 1000 | 1 | 0 | 0 | 0 |

Figure 10:
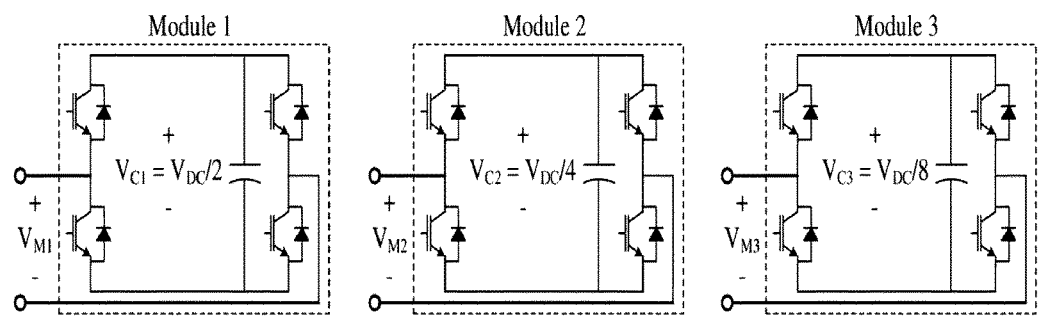
FIG. 10 is a configuration view illustrating capacitor voltages of full bridge modules of a nine-level converter.

A capacitor voltage of the half bridge module is always $V_{DC}$ which is the DC bus voltage, and capacitor voltages of the full bridge modules of the nine-level converter are configured as illustrated in FIG. 10.

FIG. 10 is a configuration view illustrating capacitor voltages of full bridge modules of a nine-level converter.

As an example in which several Modules h are required, 25 levels are implemented as shown in Table 6 in the case of three Modules h, and a sum of the levels of the Modules h through the process of Table 4 for controlling a plurality of the modules h is expressed in decimal values.

TABLE 6

| Output voltage level | Sum of Module h levels | Binary number (3 digits) | $A_1$ | $A_2$ | $A_3$ |
|---|---|---|---|---|---|
| 0 | 0 | 000 | 0 | 0 | 0 |
| 1 | 0 | 001 | 0 | 0 | 1 |
| 2 | 0 | 010 | 0 | 1 | 0 |
| 3 | 0 | 011 | 0 | 1 | 1 |
| 4 | 0 | 100 | 1 | 0 | 0 |
| 5 | 0 | 101 | 1 | 0 | 1 |
| 6 | 0 | 110 | 1 | 1 | 0 |
| 7 | 0 | 111 | 1 | 1 | 1 |
| 8 | 1 | 000 | 0 | 0 | 0 |
| 9 | 1 | 001 | 0 | 0 | 1 |
| 10 | 1 | 010 | 0 | 1 | 0 |
| 11 | 1 | 011 | 0 | 1 | 1 |
| 12 | 1 | 100 | 1 | 0 | 0 |
| 13 | 1 | 101 | 1 | 0 | 1 |
| 14 | 1 | 110 | 1 | 1 | 0 |
| 15 | 1 | 111 | 1 | 1 | 1 |
| 16 | 2 | 000 | 0 | 0 | 0 |
| 17 | 2 | 001 | 0 | 0 | 1 |
| 18 | 2 | 010 | 0 | 1 | 1 |
| 19 | 2 | 011 | 0 | 1 | 0 |
| 20 | 2 | 100 | 1 | 0 | 1 |
| 21 | 2 | 101 | 1 | 0 | 0 |
| 22 | 2 | 110 | 1 | 1 | 0 |
| 23 | 2 | 111 | 1 | 1 | 1 |
| 24 | 3 | 000 | 0 | 0 | 0 |

The number of cases of module states according to output levels of a converter is as below.

When a converter is controlled once while taking the total number of cases into account without using the control algorithm provided in the present invention, the number of cases shown in FIG. 7 has to be considered in the case of the nine-level converter.

TABLE 7

| Output voltage level | Module h | Module 1 | Module 2 | Module 3 |
|---|---|---|---|---|
| 0 | (−) | (0) | (0) | (0) |
| 1 | (−) | (0) | (0) | (+) |
| | (−) | (0) | (+) | (−) |
| | (−) | (+) | (−) | (−) |
| | (0) | (−) | (−) | (−) |
| 2 | (−) | (0) | (+) | (0) |
| | (−) | (+) | (−) | (0) |
| | (0) | (−) | (−) | (0) |
| 3 | (−) | (0) | (+) | (+) |
| | (−) | (+) | (−) | (+) |
| | (−) | (+) | (0) | (−) |
| | (0) | (−) | (0) | (−) |
| | (0) | (−) | (−) | (+) |
| 4 | (−) | (+) | (0) | (0) |
| | (0) | (−) | (0) | (0) |
| 5 | (−) | (+) | (+) | (−) |
| | (−) | (+) | (0) | (+) |
| | (0) | (−) | (0) | (+) |
| | (0) | (−) | (+) | (−) |
| | (0) | (0) | (−) | (−) |
| 6 | (−) | (+) | (+) | (0) |
| | (0) | (−) | (+) | (0) |
| | (0) | (0) | (−) | (0) |
| 7 | (−) | (+) | (+) | (+) |
| | (0) | (−) | (+) | (+) |
| | (0) | (0) | (−) | (+) |
| | (0) | (0) | (0) | (−) |
| 8 | (0) | (0) | (0) | (0) |

As the number of modules increases, the number of cases at a typical output voltage level increases exponentially, increasing an output voltage level becomes very difficult, and system resource requirements for the control also increase exponentially.

The control method provided in the present invention resolves the above-described problem using a simple addition principle of receiving and transferring, and the control may be performed even at a very high output voltage level by simply adding control blocks of FIG. 8.

Application of the apparatus for controlling an asymmetric modular multilevel converter to an asymmetric cascaded H-bridge converter is performed as below.

Figure 11:
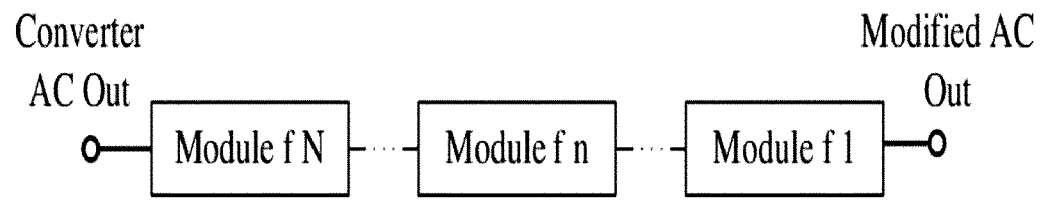
FIG. 11 is a core configuration view of a cascaded half bridge converter.

A cascaded H-bridge converter is the converter in which H-bridge (full bridge) converters are connected in series, and FIG. 11 is a core configuration view of the cascaded half bridge converter.

"Converter AC Out" shown in FIG. 11 may be an output of various voltage source converters such as a single-phase single-level converter which is the simplest form of converter, multi-level converter, MMC or the like, and the cascaded H-bridge converter subdivides such outputs and implements a high voltage level to output "Modified AC Out" as a new output.

In a conventional H-bridge converter, a case in which each module is responsible for the same voltage has been the mainstream and, even when voltages between the modules are configured to be different, the number of modules does not exceed three. This is because, as in the case of the asymmetric MMC, control becomes exponentially complex when voltages between modules are different from one another as the number of levels increases.

In contrast, a full bridge control portion of the asymmetric MMC controller provided in the present invention may be applied to the asymmetric cascaded H-bridge without change and may simply implement a very high voltage level.

That is, an asymmetric cascaded H-bridge converter having over 10 output voltage levels may be implemented by the present controller.

The highest voltage among capacitor voltages of the cascaded H-bridge is configured to be half an interval between each voltage level of "Converter AC Out".

That is, in the case of the single-level converter, since "Converter AC Out" is $-\frac{1}{2}V_{DC}$ and $+\frac{1}{2}V_{DC}$, the highest capacitor voltage is $\frac{1}{2}V_{DC}$. Likewise, when a three-level multi-level converter is assumed, the highest capacitor voltage is $\frac{1}{4}V_{DC}$ because "Converter AC Out" is $-\frac{1}{2}V_{DC}$, 0, and $+\frac{1}{2}V_{DC}$.

The control method is the same as that of the Module f n which is the full bridge module of the AMMC, and when levels of "Converter AC Out" are assumed to be a J level, levels of "Modified AC Out" of the asymmetric cascaded H-bridge converter configured with N H-bridges become "$(J-1)\cdot 2^N+1$."

FIGS. 12A to 12F are operation graphs of an asymmetric modular multilevel converter apparatus according to the embodiment of the present invention.

Since a voltage difference between individual levels compared to the whole voltage level is reduced as the output voltage level of the multilevel converter increases, the capacitor voltage at each module needs to be maintained very constant in order not to degrade an increase effect of the output voltage level.

Since an operation speed of the controller needs to be very high and a capacitor size of the module needs to be very large to attain this end, in practical application, an appropriate level needs to be chosen depending on a situation.

Figure 12A:
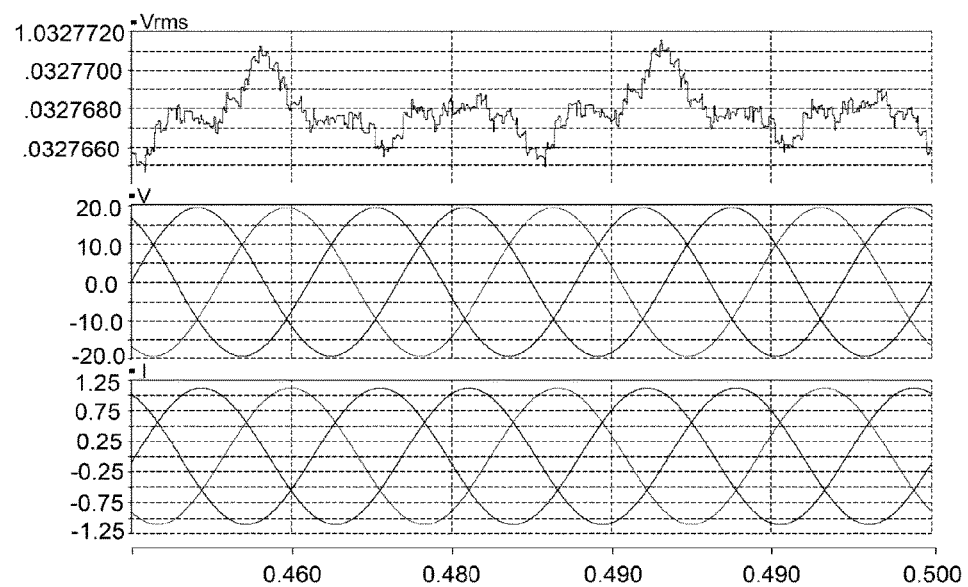
FIGS. 12A to 12F are operation graphs of an asymmetric modular multilevel converter apparatus according to the embodiment of the present invention.

To demonstrate easy control of the high output voltage level which is a strong point of the present invention, when a very high voltage level of 2049 levels is chosen and simulated, the result shown in FIG. 12A may be obtained.

A variation rate of a root mean square (RMS) voltage is constant at $7.5 \times 10^{-5}\%$ and the voltage shows a pure sine wave with almost no harmonics.

Figure 12B:
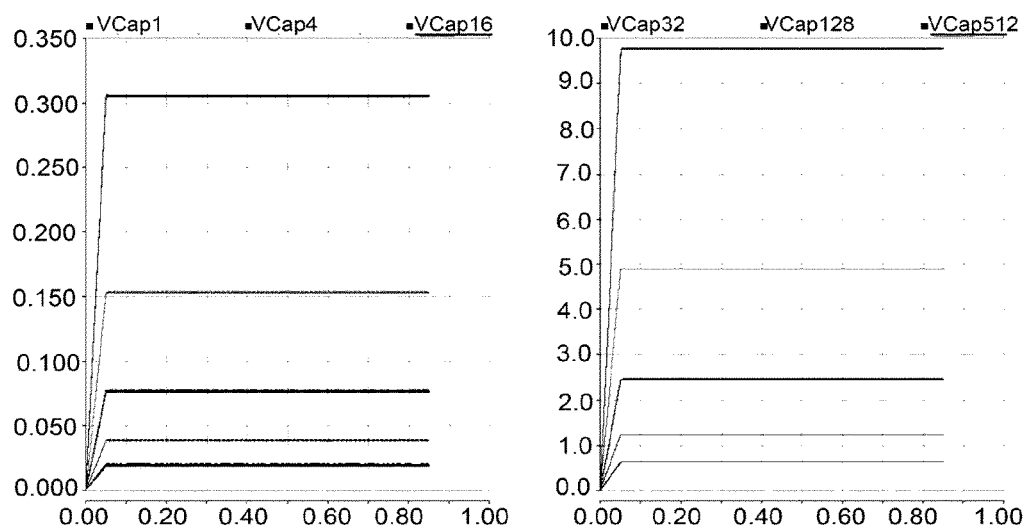

Here, capacitor voltages of each module are maintained at multiples of two according to levels as shown in FIG. 12B.

At a very high voltage level, since an output voltage becomes close to a sine wave not by a method of comparing carrier signals with sine waves but by only maintaining constant voltage levels at each level, a burden of converter control may be partially reduced by removing comparison logic between carrier signals and sine waves.

Figure 12C:
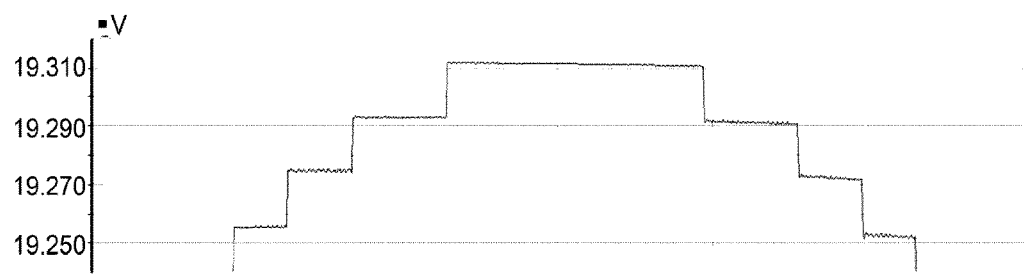

FIGS. 12A and 12B are results from a method of operating modules by converting sine wave input signals to integers without a comparison logic with carrier signals, and FIG. 12C is an enlarged view of a portion of the output voltage of FIG. 12B. Since there is no comparison logic with carrier signals, the voltage at each level is maintained at a constant level rather than showing an output form of pulse width modulation (PWM).

In such a 2049 level operation, it is very difficult to count all the output voltage levels at once because the output voltage is very close to a pure sine wave.

Figure 12D:
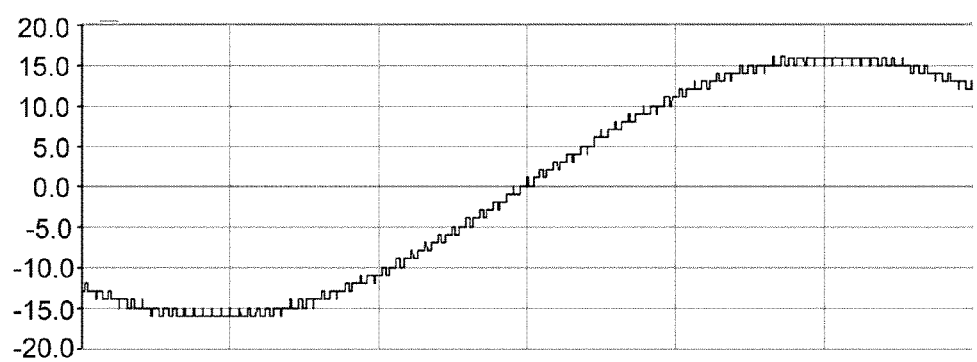

FIG. 12D demonstrates that a converter proposed from a simulation result of a 33 level converter outputs exactly 33 level voltages as intended.

Since accurately checking the voltage levels is difficult when a load is very large due to an inductor inside the converter, the voltage levels were measured by setting the load to zero.

Here, since the output level of the converter is not as high as the above-described 2049 levels, the 33 level converter demonstrated that application of the PWM to the developed AMMC using comparison logic between carrier signals and sine waves also was no problem.

Figure 12E:
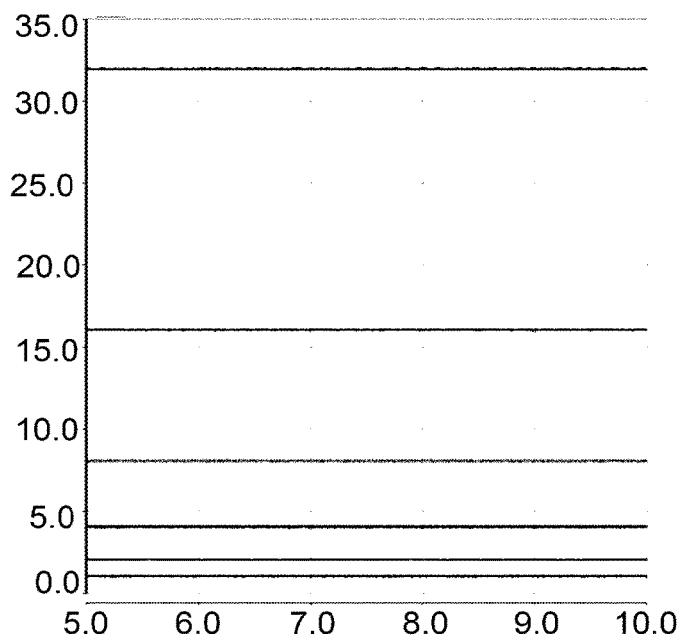

To verify voltage sustainability at a rated load, a simulation test was conducted while supplying power to the rated load, and FIG. 12E shows that capacitor voltages of each module are maintained at constant levels.

Figure 12F:
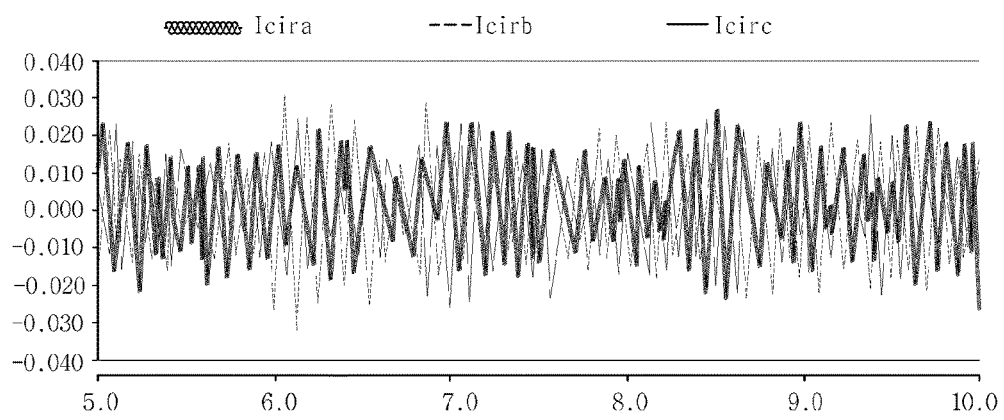

FIG. 12F shows a load current, a DC current, and a circulating current according to a converter operation at rated values.

The DC current is constantly maintained at a level of an RMS value of the load current, and the calculating current is within 3% and almost does not exist. That is, the present converter is free from large-scale DC shaking and a large-scale circulating current problem that may be generated due to physical limitations of an asymmetric module.

The above-described apparatus and method for controlling an asymmetric modular multilevel converter according to the embodiment of the present invention is capable of expressing numerous levels according to combinations of modules each using a different voltage, is configured as an asymmetric arm configured with full bridges and half bridges, and is capable of accurately controlling capacitor levels of each full bridge and capacitor levels of the remaining half bridges to be different from one another by a full bridge structure.

The apparatus and method for controlling an asymmetric modular multilevel converter according to embodiments of the present invention described above has the following effects.

First, the converter is configured as an asymmetric arm configured with full bridges and half bridges and is capable of expressing numerous levels according to a combination of different modules each using a different voltage.

Second, the converter is configured as an asymmetric arm configured with full bridges and half bridges and is capable of accurately controlling capacitor levels of each full bridge and capacitor levels of the remaining half bridges to be different from one another by a full bridge structure.

Third, the converter can implement an exponentially increased number of output voltage levels compared to a number of modules by using a different capacity voltage for each level and can eliminate a circulating current and constantly control capacitor voltages by precise control of a full bridge.

Fourth, the full bridge structure can serve the role of blocking a fault current introduced from the AC circuit when a problem occurs at the DC circuit.

Fifth, the converter can be effectively applied to a power transmission management system because the converter can eliminate a circulating current and constantly control capacitor voltages by precise control of a full bridge.

As described above, it will be understood that the present invention is implemented in a modified form without departing from the spirit and features of the present invention.

Therefore, the above-described embodiments should be considered in a descriptive sense only, the scope of the present invention shall be represented according to the claims below rather than the foregoing description of the embodiments, and all differences within an equivalent scope thereof should be interpreted as being included in the scope of the present invention.

REFERENCE NUMERALS

10: UPPER ARM
20: LOWER ARM

What is claimed is:

1. An apparatus for controlling an asymmetric modular multilevel converter, comprising:
an asymmetric arm connected between a positive (+) input terminal and a negative (−) input terminal of a DC bus voltage ($V_{DC}$) and including
N modules of full bridge converter, and
K modules of half bridge converter, wherein said N and K are constant number, respectively; and
a control method controlling each capacitor voltage of the N modules of full bridge converter and each capacitor voltage of the K modules of half bridge converter to be different from one another,
wherein each module configuring the asymmetric arm uses a different voltage and an output voltage is expressed by a combination thereof,
each of the K modules of half bridge converter is responsible for an equally divided voltage, and
a sum of capacitor voltages of the K modules of half bridge converter is always equal to the DC bus voltage ($V_{DC}$) when the asymmetric modular multilevel converter (AMMC) is in a normal state.

2. The apparatus of claim 1, wherein:
an upper arm and a lower arm of the asymmetric arm are connected in series between the positive (+) input terminal and the negative (−) input terminal, and a $V_{AC}$ output terminal is connected between the upper arm and the lower arm to configure a single-phase asymmetric modular multilevel converter; and
three single-phase asymmetric modular multilevel converters are connected by sharing the DC bus voltage ($V_{DC}$) to configure a three-phase asymmetric modular multilevel converter.

3. The apparatus of claim 1, wherein:
capacitor voltages of the N modules of full bridge converter are configured to be different in sequence by control; and
a capacitor voltage of a first module of the N modules of full bridge converter is ½ of the DC bus voltage, a capacitor voltage of a second module of the N modules of full bridge converter is ¼ of the DC bus voltage, and a capacitor voltage of a Nth module of the N modules of full bridge converter is $2^{-N}$ of the DC bus voltage.

4. The apparatus of claim 1, wherein:
when the asymmetric arm includes only one module of half bridge converter, two levels of the output voltage are implemented by the asymmetric arm, and
when the asymmetric arm includes K modules of half bridge converter, K+1 levels of the output voltage in total are implemented by the asymmetric arm; and
a capacitor voltage reference value of the N modules of full bridge converter is 1/K.

5. The apparatus of claim 1, wherein the N modules of full bridge converter and the K modules of half bridge converter implement a total of $2^N \cdot K+1$ levels of the output voltage.

6. The apparatus of claim 1, wherein:
when the asymmetric arm includes one module of half bridge converter, a sum of capacitor voltages of the K modules of half bridge converter is equal to the DC bus voltage ($V_{DC}$)·$(1-2^{-N})$, and
when a fault occurs at a DC circuit, a fault current is blocked by a capacitor voltage of $1/(1-2^{-N})$ times of the sum of capacitor voltages in the normal state.

7. The apparatus of claim 1, further comprising an asymmetric cascaded H-bridge converter,
wherein the asymmetric cascaded H-bridge converter includes full bridge converters connected in series, and
the asymmetric cascaded H-bridge converter subdivides the output voltage into a single-level, a multi-level, and a multilevel converter (MMC) to output a modified output having over ten output voltage levels.

8. The apparatus of claim 7, wherein, when the output voltage has J levels, the modified output voltage of the asymmetric cascaded H-bridge converter has $(J-1) \cdot 2^N+1$ levels, wherein said J is constant number.

9. A method of controlling an asymmetric modular multilevel converter, the asymmetric modular multilevel converter comprising an asymmetric arm connected between a positive (+) input terminal and a negative (−) input terminal of a DC bus voltage ($V_{DC}$) and including
N modules of full bridge converter, and
K modules of half bridge converter, wherein said N and K are constant number, respectively,
the method comprising:
each of the K modules of half bridge converter is responsible for an equally divided voltage;
a sum of capacitor voltages of the K modules of half bridge converter is always equal to the DC bus voltage ($V_{DC}$) when the asymmetric modular multilevel converter is in a normal state; and
capacitor voltages of the N modules of full bridge converter are configured to be different in sequence by control,
wherein an output voltage of the K modules of half bridge converter is within a range of the DC bus voltage, and each of the capacitor voltages of the K modules of half bridge converter is maintained at a level of $1/KV_{DC}$.

10. The method of claim 9, wherein, when a current (i) flows into an arm which configures the asymmetric modular multilevel converter from the positive input terminal of the DC bus voltage ($V_{DC}$) a capacitor voltage ($V_C$) applied to a capacitor of an nth module of the N modules of full bridge converter is controlled such that $(V_{DC}/2^n - V_{Cn})*i>0$, wherein the $V_{Cn}$ is a capacitor voltage of the nth module.

11. The method of claim 10, wherein when $(V_{DC}/2^n - V_{Cn})>0$, the capacitor voltage of the nth module is equal to or lower than an optimal level and requires charging, and when i>0, the nth module is controlled by a negative state (−) to charge the capacitor of the nth module.

12. The method of claim 10, wherein, when $(V_{DC}/2^n - V_{Cn})<0$, the capacitor voltage of the nth module is equal to or higher than an optimal level and requires discharging, and when i<0, the nth module is controlled by a negative state (−) to discharge the capacitor of the nth module.

13. The method of claim 10, wherein:

when $(V_{DC}/2^n - V_{Cn})=0$, the nth module is controlled by a zero state (0) to maintain the capacitor voltage of the nth module without charging or is controlled to repeat a positive state (+) or a negative state (−); and when $(V_{DC}/2^n - V_{Cn})<0$ while i>0 and $(V_{DC}/2^n - V_{Cn})>0$ while i<0, the nth module is controlled by the positive state (+) to discharge or charge the capacitor of the nth module.

14. The method of claim 9, wherein:

an upper arm and a lower arm of the asymmetric arm are connected in series between the positive input terminal and the negative input terminal, and a $V_{AC}$ output terminal is connected between the upper arm and the lower arm to configure the asymmetric modular multilevel converter;

modules of each arm are controlled such that a sum of voltages of the K modules of half bridge converter applied to each of the upper arm and the lower arm is $V_{DC}$; and a half of a total number of the half bridge converter of the upper arm and the lower arm is always turned on or off.

15. The method of claim 14, wherein voltage control of the K modules of half bridge converter is performed such that a module having the lowest voltage is first charged and a module having the highest voltage is first discharged.

* * * * *